Nov. 27, 1934.　　　A. C. DURDIN, JR　　　1,982,578
AUTOMATIC CONTROL MECHANISM FOR ELECTRIC MOTORS
Filed Jan. 14, 1933　　2 Sheets-Sheet 1
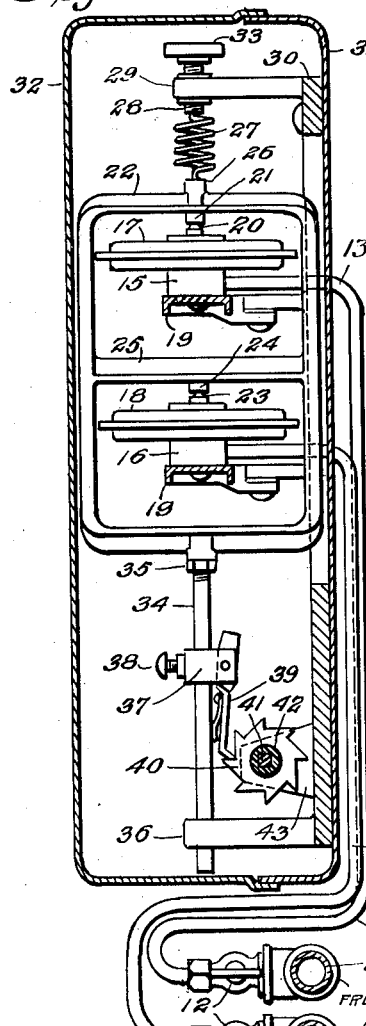
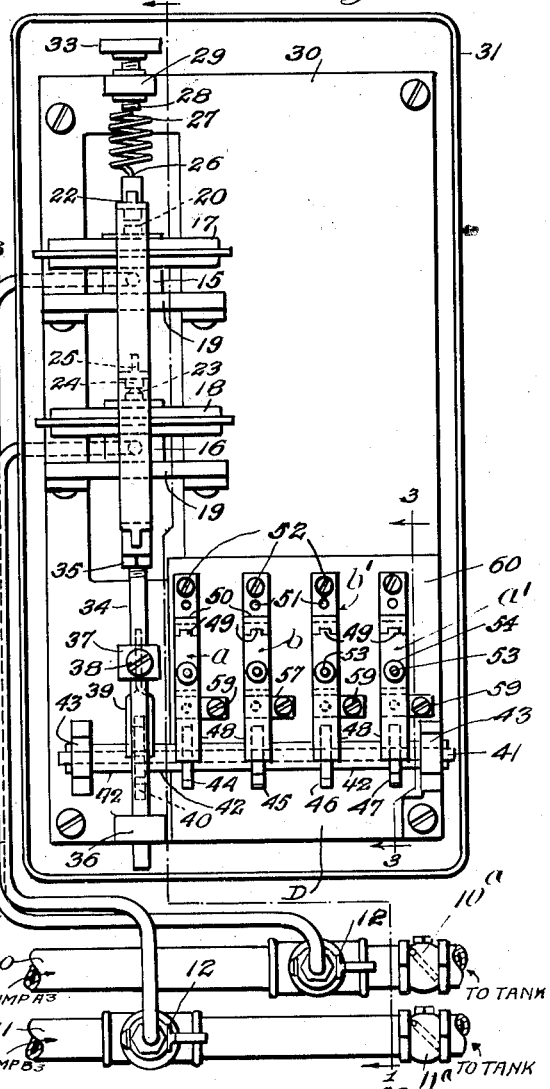
INVENTOR.
Augustus C. Durdin Jr.,
BY
ATTORNEY.

Nov. 27, 1934.  A. C. DURDIN, JR  1,982,578
AUTOMATIC CONTROL MECHANISM FOR ELECTRIC MOTORS
Filed Jan. 14, 1933  2 Sheets-Sheet 2
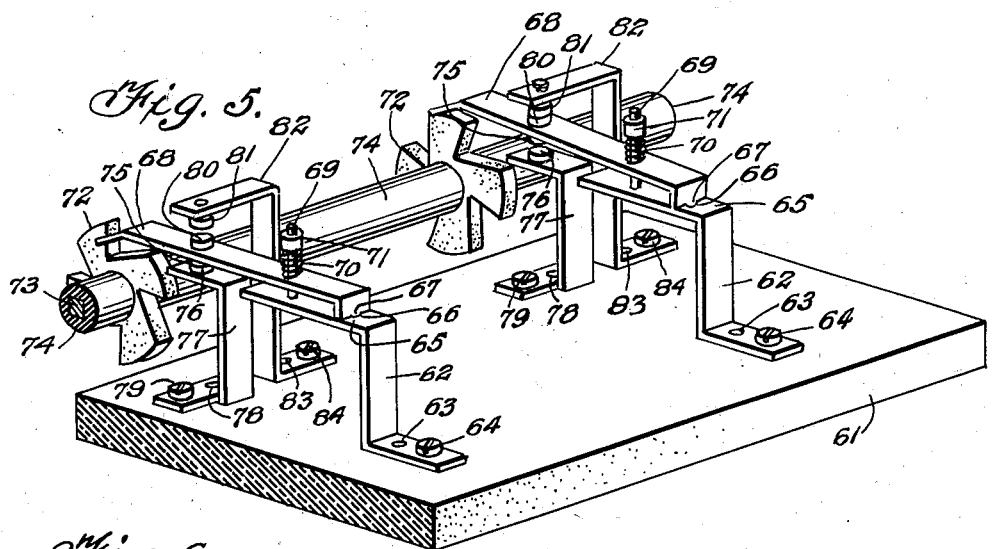
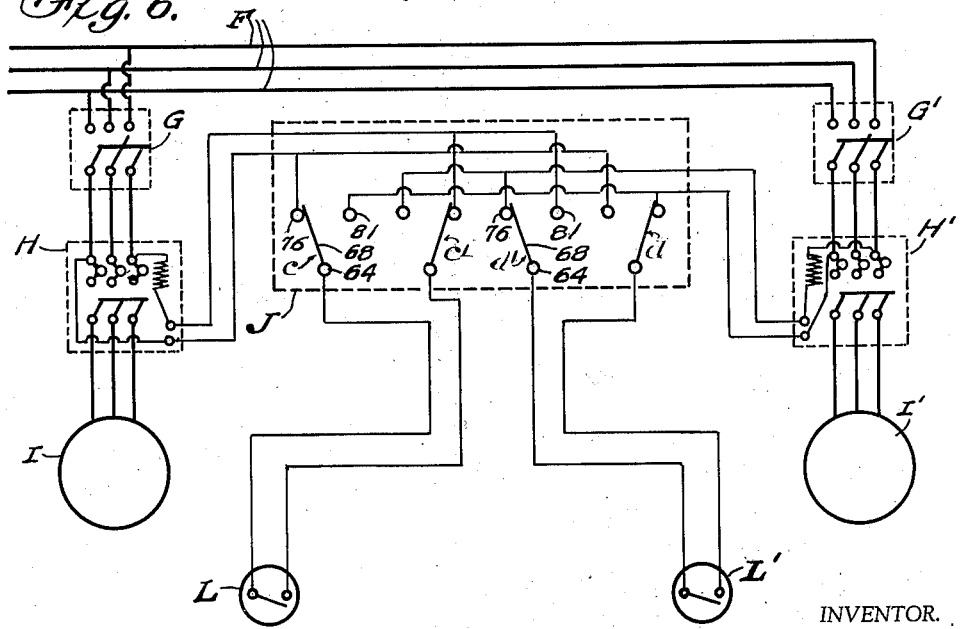
INVENTOR.
Augustus C. Durdin, Jr.,
BY
ATTORNEY.

Patented Nov. 27, 1934

1,982,578

UNITED STATES PATENT OFFICE 1,982,578

AUTOMATIC CONTROL MECHANISM FOR ELECTRIC MOTORS

Augustus C. Durdin, Jr., Chicago, Ill., assignor to Chicago Pump Company, Chicago, Ill., a corporation of Illinois Application January 14, 1933, Serial No. 651,672

7 Claims. (Cl. 103—11)

This invention relates to automatic control mechanism for electric motors and has reference more particularly to control mechanism operating to cause sequential operation of two or more electric motors, and for starting an idle motor in case the active one is incapable of performing all of the work required of it.

In duplex pumping systems, which employ electric motor driven pumps, it is very desirable that the work of the two pumps be divided between them by causing automatic alternate operation of the pumps, and that in case the active pump is incapable of performing all of the work required of it, the idle pump should be set into operation automatically to aid the other pump in completing its work.

In accordance with the present invention, variation of pressure obtained at the pumps has been utilized to actuate the mechanism for causing the alternate operation of the pumps. In the case of pressure pumps, the plus pressure at the discharge side thereof is utilized, whereas in the case of vacuum pumps, minus pressure at the intake side is used. The advantages of utilizing the variations in pressure, either plus or minus pressure, taken at the pumps, are that it is economical, reliable and does not require such finely adjusted and sensitive instruments as are required in situations where the pressure at the tank is used to actuate the control mechanism.

The invention consists in automatic control mechanism for electric motors, the actuating mechanism of which is operated in response to variations of pressure produced at the pumps that are driven by the motors. It further consists in actuating mechanism as above described, and a circuit transferring switch for the motors, operated by said actuating mechanism whereby to cause alternate operation of the motors. It further consists in the provision of pilot switches in connection with said circuit transferring switch whereby the motors are started alternately and whereby an idle motor is started in case the active motor or rather the pump driven thereby, is incapable of performing all of the work required of it.

The invention further consists in the several novel features hereinafter fully set forth and claimed.

The invention is clearly illustrated in the accompanying drawings, in which:

Fig. 1 is a view of the actuating mechanism for the circuit transferring mechanism, partly in side elevation and partly in vertical cross section taken on the line 1—1 of Fig. 2;

Fig. 2 is a front elevation of the control mechanism with the cover removed;

Fig. 3 is a detail vertical cross section taken on the line 3—3 of Fig. 2;

Fig. 4 is a diagrammatic view illustrating the application of the preferred form of the invention to a pumping system;

Fig. 5 is a fragmental perspective view of a fragment of a modified form of the circuit transferring mechanism and Fig. 6 is a diagrammatic view illustrating the circuits in connection with said modified form.

Referring to said drawings, and first to Figs. 1 to 4 inclusive, the reference characters A, B designate the electric motors of a duplex installation of pumping units; $A^1$, $B^1$ designate the automatic starters for the motors; $A^2$, $B^2$ designate the pilot switches for closing the circuits and $A^3$, $B^3$ designate the pumps which are driven by the motors A, B and in the present application of the invention serve to pump liquid or other fluid to a storage tank (not shown). The pilot switches $A^2$, $B^2$, may be in the form of pressure, vacuum or float switches connected to and responsive to variations of pressure or water level in the tank, to or from which the liquid or fluid is pumped. In the present application of the invention, two pole pilot switches, in the form of pressure switches, are employed, connected to the storage tank into which the liquid or fluid is pumped by the pumps. Each pilot switch is adapted to close the circuits for both starters, and one pilot switch is set to close in advance of the other, whereby to start either one of the motors, the other pilot switch acting to close and start an idle motor in case the active one is incapable of performing all of the work. The circuit controlling mechanism for effecting the alternate operations of the two motors is illustrated at D. The motors are supplied by the feeder mains E, which in this instance, is shown as a three phase circuit. In the embodiment of the invention illustrated, the starter circuits controlled by the pilot switches include branches from the main line and elements of the starters. These circuits control the starting and stopping of the motors. In installations where the starters are not used, the pilot switches also control the starting and stopping of the motors.

The circuit controlling mechanism D is shown as actuated by pressure diaphragms, but with similar parts and reversal of order it may be used equally as satisfactorily on vacuum actuated diaphragms.

Piping serving to transmit the liquid or fluid handled is shown at 10, 11, the pipe 10 being connected to the pump A³, and the pipe 11 to the pump B³ and when the circuit controlling mechanism is made responsive to plus pressure, the pipes 10, 11 are connected to the discharge side of the pumps and lead to the storage tank or other receptacle or place to which the liquid or fluid is pumped.

Leading from valves 12, connected to said pipes by T's or otherwise, are tubes 13, 14 that run respectively to the hubs 15, 16 of two diaphragms 17, 18 that are mounted on bars 19 secured to and supported by a base 30 that is contained in a housing 31, provided with a cover 32. The bars permit of the use of shims to effect proper adjustment of the diaphragms. The housing may of course be supported in any desirable manner.

The diaphragm 17 is provided with a cone or other stud 20 on its expansible side, which engages with a socket member 21 carried by a yoke 22, and the diaphragm 18 also has a cone or stud 23 on its expansible side which engages with a socket member 24 carried by a cross bar 25 of the yoke 22 whereby motion may be transmitted from either diaphragm to the yoke. In other words, pressure set up in either diaphragm will cause expansion of the diaphragm in which the pressure is set up and as a result the yoke will be moved endwise, or upwards in the case of the one illustrated.

On the upper end of the yoke is a socket member 26 which receives one end of a compression spring 27 the other end of which is received in a socket on the end of an adjustment screw 28 threadedly mounted in a bracket 29 that extends out from the base 30. A thumb wheel or knob 33 on the end of the adjustment screw 28 provides means whereby the latter may be easily manipulated.

The yoke 22 has a guide rod 34 extending from its end opposite the spring 27, which rod may be screwed into the end of the yoke and locked thereto by a lock nut 35. The guide rod 34 is guided for endwise movement in a bracket or arm 36, which projects out from the base 30, thus providing guiding means for the longitudinal movement of the yoke.

Upon the guide rod 34 is a collar 37, secured thereon as by a set screw 38, which collar carries a spring pressed pawl or detent 39 that engages with a ratchet wheel 40, rigidly mounted on a shaft 41, journaled in bearing brackets 43 that extend out from the base 30. The diaphragm, yoke, spring, guide rod, pawl and ratchet wheel provide pressure operated actuating means, responsive to pressure variations and acting to operate a circuit transferring switch for effecting the alternate operation of the motors. It will be understood from the above that the reciprocating movements of the yoke 22 are translated into the rotary movement of the ratchet wheel and shaft. The circuit transferring mechanism will now be described.

Rigidly mounted on the shaft 41 are star wheels or notched discs 44, 45, 46, 47, desirably formed of fiber or other non-conducting material. Preferably the shaft 41 is square and engages in square holes in the ratchet wheel 40, and in the star wheels or notched discs 44, 45, 46, 47, said wheels being held in spaced relation by washers 42, or otherwise as desired. The star wheels serve to actuate contact members of the circuit transferring mechanism to control the circuits for the two motors as will be presently described.

The notches of the two star wheels or notched discs 44, 47 are aligned, that is they occur in the same relationship, and the notches of the two star wheels 45, 46 are also aligned, but they occur intermediate the notches of the star wheels 44, 47, the purpose of which will be presently apparent. Desirably there are as many teeth on the ratchet wheel 40 as there are notches and points or high parts on the star wheels, so that the step by step rotation of the ratchet wheel will cause step by step rotation of the star wheels, each step bringing notches into the position formerly occupied by the points or high parts and vice versa.

Mounted to ride upon the star wheels are movable spring pressed contact pieces 48, the terminal ends of which are arranged to enter the notches thereof, when they present themselves to the terminal ends. Each contact piece 48 co-operates with a stationary contact piece 57 to intermittently close a break in an electric circuit as will be presently explained.

Desirably each contact piece 48 is mounted on a bracket 50 as by a lug 49 entering a hole in the bracket, and each contact piece is spring pressed against the associated star wheel by a spring 55 interposed between the contact piece and an adjustment nut 54, threaded upon a guide screw 53 that extends through the bracket and contact piece. Each stationary contact piece and associated bracket are mounted upon a base 60 of insulating material as by screws 58, 51, and binding posts 59, 52 for the electric wires are provided in the stationary contact piece and bracket. Desirably each contact piece 48 is provided with a contact point 56, which makes contact with a corresponding contact point $56^a$ on the stationary contact piece 57. The parts just described provide four contacts $a$, $a^1$, $b$, $b^2$.

With the notches and high parts of the several star wheels disposed as above described, two of the movable contact pieces are engaged in the notches of the star wheels thereby effecting contact between the contact points of said two movable contact members with the contact points of the two associated stationary contact members, thereby closing the breaks in the circuits controlled by said contact pieces, and the other two movable contact pieces are held out by the high parts of the associated star wheels, thereby separating the contact points of those movable contact pieces and their associated stationary contact pieces. Each time the star wheels are rotated one step this order is reversed so that the previously closed contacts are opened and the previously open contacts are closed.

The circuit transferring mechanism just described functions as a double throw switch, and acts to transfer the circuit from one pilot switch first to one motor and then to the other and so on.

The circuits for controlling the two motors may be readily traced in the diagrammatic view shown in Fig. 4. It is to be observed that pilot switch $A^2$ always closes first. With the contacts $a$, $a^1$ closed, when the pilot switch $A^2$ closes, the circuit for motor A may be traced from the starter $A^1$ through closed contact $a$, through pilot switch $A^2$, and back to starter $A^1$, which controls motor A. In case motor A or rather the pump $A^3$ which is driven thereby is incapable of performing all of the work required of it, pilot switch $B^2$ then closes. The circuit through starter $B^1$ is through closed contact $a^1$ through closed pilot switch $B^2$ and back to starter $B^1$. When the contacts $a$ and $a^1$ are open and contacts $b$, $b^1$ closed, the circuit for motor B can be traced from starter $B^1$, through contact $b$ pilot switch $A^2$, and back to starter B¹. In case pilot switch B² is also closed the circuit for motor A may be traced from starter A¹ through closed contact b¹ pilot switch B² and back to starter A¹.

In operation and assuming the motors to be idle, and the contacts of the circuit transferring mechanism in the position illustrated in Fig. 4, when a change takes place in the system with which the control mechanism is used, as for instance in case the pressure in the storage tank falls below normal, or the water level therein falls below a predetermined level, or the water in a well or sump rises above a predetermined level, the pilot switch A² closes the circuit for the starter A¹, of motor A, through the contact a, thereby starting pump A³. Pressure is set up in the pipe 10 which leads from pump A³, and in pipe 13, and diaphragm 17, and the latter is thereby expanded and the yoke 22 moved upward, carrying the pawl or detent 39 up for engagement on its down stroke with the next adjacent tooth of the ratchet wheel 40. When conditions have been restored to normal in the system, the pilot switch opens, breaks the circuit and stops motor A, which is the only one which was started. The pressure in the pipe 10 between the check valve 10ª and pump rapidly falls and consequently the pressure in the pipe 13 and diaphragm 17 falls and as a result the yoke 22 is lowered, the pawl or detent turning the ratchet wheel one step and thereby turning the star wheels one step. The contact pieces 48 of contacts a, a¹, which previously were engaged in the notches of the associated star wheels, are swung out, thereby opening the contacts a, a¹, and the contact pieces 48 of the contacts b, b¹ which previously were engaged on the high places of the star wheels are let into the notches of the associated star wheels thereby closing the contacts b, b¹. As a result, the circuit through the pilot switch A² is transferred to motor B, so that the next time pilot switch A² is closed, motor B will be started, and pressure set up in pipe 11, pipe 14 and diaphragm 18 and the same operation of the actuating mechanism and circuit transferring mechanism takes place as before and the circuit from pilot switch A² is again transferred to motor A.

As has been explained, if pilot switch B² is also closed while either motor is running the circuit for the idle motor will be closed through the circuit transferring mechanism, thereby causing both motors to operate simultaneously.

In Figs. 5 and 6 is illustrated a slightly modified form of the invention wherein single pole pilot switches are employed to close the circuits. In Fig. 5 two contacts are illustrated, but it is to be understood that four are required as is indicated in Fig. 6 to obtain alternate and simultaneous operation of the motors.

An insulating base 61 is provided to support sets of stationary contact pieces 77 and 82, and the brackets 62 for the movable contact pieces 68. The contact pieces 77, 82 are fastened to the base by screws 78, 83, and the bracket 62 is fastened to the base by screws 63. Binding posts 79, 84, 64 are provided in the contact pieces 77, 82 and brackets 62 for connection with the electric wires. The movable contact pieces 68 are mounted upon the brackets 62 as by lugs 67, entering holes 66 in the brackets, and springs 70 confined between the contact pieces 68 and adjustment nuts 71 on threaded stems 69 exert pressure upon the contact pieces to hold them in engagement with star wheels as will presently appear.

A shaft 73 corresponding to the shaft 41 of the preferred form, and operated by corresponding actuating mechanism is provided, which is journaled in suitable bearing brackets and has star wheels 72 rigidly secured thereon and spaced apart as by collars 74. The movable contact pieces 68 are spring pressed upon the star wheels by the springs 70 and ride upon the high places and are depressed into the notches or spaces between the high places, as the star wheels are rotated in a step by step movement, as in the preferred form.

In this form of the invention each movable contact piece alternately makes contact with one of two associated stationary contact pieces 77, 82, so that in either position of each movable contact piece, it closes a break in a circuit. Desirably the movable contact piece has contact points 75, 80, which make contact with corresponding contact points 76, 81 on the respective stationary contact pieces 77, 82. The star wheels are set on the shaft so that two of the movable contact members are engaged in the notches, with the contact points 75, 76, in contact and with two contact pieces riding on the high places of the star wheels, with the contacts 80, 81 in contact.

The circuits are illustrated diagrammatically in Fig. 6, in which F designates the feed wires, G, G¹ manually controlled switches, H, H¹ the starters, I, I¹ the motors, J the control mechanism and L, L¹ the two single pole pilot switches.

The starter circuit for the motor I may be traced from the starter H, through closed contact C, pilot switch L, (when closed) through closed contact C¹ and back to starter H. When the second pilot switch L¹ is also closed, the starter circuit for motor I¹ may be traced from starter H¹, through closed contact d pilot switch L¹, contact d¹ and back to starter H¹. When the active motor has completed its work, the pilot switch opens and stops the active motor, and as in the preferred form the actuating mechanism for the circuit transferring mechanism shifts the movable contact pieces thereof, thereby transferring the circuit from the pilot switch L, to motor I¹ and from pilot switch L¹ to motor I, thereby effecting the alternate operation of the two motors.

From the above it is apparent that the actuating mechanism of the circuit transferring mechanism is operated by variations of pressure produced at the pumps, either plus or minus pressure, and in the claims the term "pressure" has reference to plus or minus pressure.

It is also to be observed that by connecting the diaphragms with the two pumps or with the piping at places adjacent thereto, the variations of pressure that take place at the pumps is utilized, which eliminates the necessity for the use of fine adjustments or very sensitive instruments. When connected with the discharge sides of pumps that pump into a closed tank, the diaphragms are connected to the piping between the pumps and check valves. When a pump ceases to operate after having restored the pressure or level in the tank, the pressure at the pump quickly falls thereby permitting the actuating mechanism to operate the circuit transferring switch while the circuits are open. When the control mechanism is used in connection with a bilge or lift pump the check valves may be omitted inasmuch as the pressure at the discharge sides of the pumps falls quickly, permitting the actuating mechanism to operate the circuit transferring switch while the circuit is open.

I claim as new and desire to secure by Letters Patent:

1. In combination, a plurality of electric motor driven pumps, in each of which the pressure, which is set up when the pump is in operation, presently returns to normal when the pumping action ceases, a circuit for the motor of each pump, a pilot switch for controlling said circuits, said pilot switch being responsive to changes of conditions which take place in a system in which the control mechanism is used, and a pressure operated circuit transferring switch for transferring the circuits controlled by the pilot switch from either motor to the other, said circuit transferring switch having a plurality of independently operating pressure actuated elements, each independently connected with an associated pump and being responsive solely to pressure variations that take place at the pump, the pilot switch and circuit transferring switch being in series in each aforesaid circuit.

2. In combination, a plurality of electric motor driven pumps, a circuit for the motor of each pump, a pilot switch for controlling said circuits, said pilot switch being responsive to changes of conditions that take place in a system in which the control mechanism is used, a circuit transferring switch for transferring the circuits controlled by the pilot switch from either motor to the other, the pilot switch and circuit transferring switch being in series in the aforesaid circuits, a plurality of pressure actuated elements, each independently connected with an associated pump, and being responsive solely to pressure variations that take place at the pump, and an operative connection between each pressure actuated element and the circuit transferring switch.

3. In combination, a plurality of electric motor driven pumps, a circuit for the motor of each pump, a pilot switch for controlling said circuits, said pilot switch being responsive to changes of conditions that take place in a system in which the control mechanism is used, a circuit transferring switch for transposing said circuits through the pilot switch, said pilot switch and the circuit transferring switch being in series in each aforesaid circuit, a plurality of pressure actuated elements, each independently connected with the pressure side of an associated pump, and being responsive solely to pressure variations that take place at the pressure side of the pump, and an operative connection between each pressure actuated element and the circuit transferring switch.

4. In combination, a plurality of electric motor driven pumps, a circuit for the motor of each pump, a pilot switch for controlling the circuits for the motors of the pumps, said pilot switch being responsive to changes of conditions that take place in the system in which the control mechanism is used, a circuit transferring switch for transposing said circuits through the pilot switch, said pilot switch and the circuit transferring switch being in series in the aforesaid circuits, a plurality of diaphragms, pipe connections, one between each diaphragm and an associated pump, said diaphragms being responsive solely to pressure variations that take place at the pumps, and an operative connection between each diaphragm and the circuit transferring switch.

5. In control mechanism for electric motors, the combination of a plurality of motors, a circuit for each motor, pumps, one driven by each motor, discharge pipes, one leading from each pump, a check valve in each discharge pipe, a pilot switch for controlling the aforesaid circuits, said pilot switch being responsive to changes of conditions that take place in a system in which the control mechanism is used, a transfer switch for transposing said circuits through the pilot switch, said pilot switch and the circuit transferring switch being in series in the aforesaid circuits, and actuating mechanism for the circuit transferring switch having a plurality of pressure actuated elements, one connected to each discharge pipe between the pump and check valve.

6. In control mechanism for electric motors, the combination of a plurality of motors, circuits therefor, pumps, one driven by each motor, discharge pipes, one leading from each pump to a tank, a check valve in each discharge pipe, a pilot switch in the aforesaid circuits and connected with the tank, a circuit transferring switch for transferring the circuits controlled by the pilot switch from one motor to the other, the pilot switch and circuit transferring switch being in series in the aforesaid circuits, and actuating mechanism for the circuit transferring switch having pressure actuated elements, one connected to each discharge pipe between the pump and check valve.

7. In control mechanism for electric motors, the combination of a plurality of motors, circuits therefor, pumps, one driven by each motor, discharge pipes, one leading from each pump to a tank, a check valve in each discharge pipe, primary and auxiliary pilot switches in the aforesaid circuits, and connected with the tank, a circuit transferring switch for transferring the circuits controlled by said pilot switches from one motor to the other, each pilot switch and the transfer switch being in series in the aforesaid circuits, and actuating mechanism for the circuit transferring switch, having pressure actuated diaphragms for actuating the switch mechanism of the circuit transferring switch, one diaphragm being connected to each discharge pipe between the pump and check valve.

AUGUSTUS C. DURDIN, Jr.